US007978419B2

(12) United States Patent
Towner

(10) Patent No.: US 7,978,419 B2
(45) Date of Patent: Jul. 12, 2011

(54) SCAN LENS FOR IMAGING DEVICE

(75) Inventor: David Kenney Towner, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 232 days.

(21) Appl. No.: 12/481,358

(22) Filed: Jun. 9, 2009

(65) Prior Publication Data

US 2010/0309561 A1 Dec. 9, 2010

(51) Int. Cl.
*G02B 13/08* (2006.01)

(52) U.S. Cl. ........................................................ 359/671

(58) Field of Classification Search ............... 359/207.1, 359/668, 670, 671, 686, 687, 708–715, 720, 359/721

See application file for complete search history.

(56) References Cited

U.S. PATENT DOCUMENTS 4,436,383 A 3/1984 Maeda
4,756,583 A 7/1988 Morimoto
5,682,258 A 10/1997 Yamakawa
5,691,835 A 11/1997 Iizuka
5,969,877 A 10/1999 Maeda
5,995,131 A 11/1999 Fujibayashi et al.
6,288,820 B1 9/2001 Noda
6,894,848 B2 5/2005 Yamamoto
6,999,246 B2 2/2006 Yamamoto et al.
7,397,620 B2 * 7/2008 Hayashide et al. ........... 359/896

* cited by examiner

*Primary Examiner* — Joseph Martinez

(57) ABSTRACT

A scan lens for an imaging device includes first, second, third, and fourth lens elements optically positioned in ascending numeric order between a scanning component and an imaging surface. The first lens element has an optical power in an in-scan direction of the imaging device and an optical power in a cross-scan direction of the imaging device, the optical power in the cross-scan direction being positive and greater than the optical power in the in-scan direction. The second lens element has a negative optical power in the in-scan and cross-scan directions. The third lens element has a positive optical power in the in-scan direction and cross-scan directions. The fourth lens element has an optical power in the in-scan direction and a positive optical power in the cross-scan direction, the optical power in the cross-scan direction being greater than the optical power in the in-scan direction.

15 Claims, 3 Drawing Sheets

SCAN LENS FOR IMAGING DEVICE

BACKGROUND

Imaging devices are used to form images, such as text and graphics, onto media, such as paper. One type of imaging device employs a photoconductive surface that is selectively charged or discharged in correspondence with an image to be formed on media by the imaging device. The charge pattern on the photoconductive surface is developed with a colorant like toner, which adheres to the photoconductor where the photoconductor has been selectively charged or discharged to form a developed image. The developed image is transferred to the media and permanently affixed to the media to form the image on the media. Examples of such types of imaging devices include laser printing devices and light-emitting diode (LED) printing devices.

DETAILED DESCRIPTION OF THE DRAWINGS

Overview of Problem and Solution

An imaging device that employs a photoconductive surface which is selectively charged or discharged in correspondence with an image to be formed on the media by the imaging device typically uses a scanning component, such as a polygonal mirror, to scan one or more optical beams through a scan lens and onto the photoconductive surface. The optical beams are modulated in correspondence with the image to be formed on the media. As such, the photoconductive surface is selectively charged or discharged where the optical beams expose the photoconductive surface.

In general, there are at least three goals in improving imaging devices that employ photoconductive surfaces. One goal is to improve the speed at which images can be formed on media, which may be expressed in pages-per-minute (ppm). Another goal is to increase a width of the media on which such images can be formed, which may be expressed by a sheet size standard like A4, A3, B2 portrait or B2 landscape, or units of measure like millimeters (mm). A third goal is to increase the quality of the images that can be formed on the media, which may be expressed by levels of visible artifacts such as banding, distortion density nonuniformity, and color variation.

The scan lens employed in an imaging device can be a limiting factor in achieving these goals. Some types of scan lenses, for instance, limit the number of optical beams that can be simultaneously scanned across the photoconductive surface, which affects image formation speed. Likewise, some types of scan lenses limit the width of the media on which images can be formed. Similarly, some types of scan lenses limit the quality of the images that can be formed on the media.

The inventor of the present disclosure has invented a unique scan lens that helps overcome these limitations. For example, whereas existing scan lenses may be limited to permitting about twelve optical beams to be simultaneously scanned across the photoconductive surface, the inventive scan lens permits 22, 28, 32, or more optical beams to be simultaneously scanned across the photoconductive surface. An increase in the number of scanning beams enables a proportionate increase in the speed at which images can be formed on media. Whereas existing scan lenses may be limited to forming images on media such as A4 landscape or A3 portrait (i.e., about 320 mm) widths, the inventive scan lens permits the formation of images on media having B2 portrait (i.e., 540 mm) or B2 landscape (i.e., 760 mm) widths (where the stated widths include margins for crop marks). Whereas existing scan lenses may be limited to forming images having visible artifacts due to lens aberrations, the inventive scan lens permits the formation of images on media having reduced levels of visible artifacts and correspondingly improved image quality.

Scan Lens

Figure 1A:
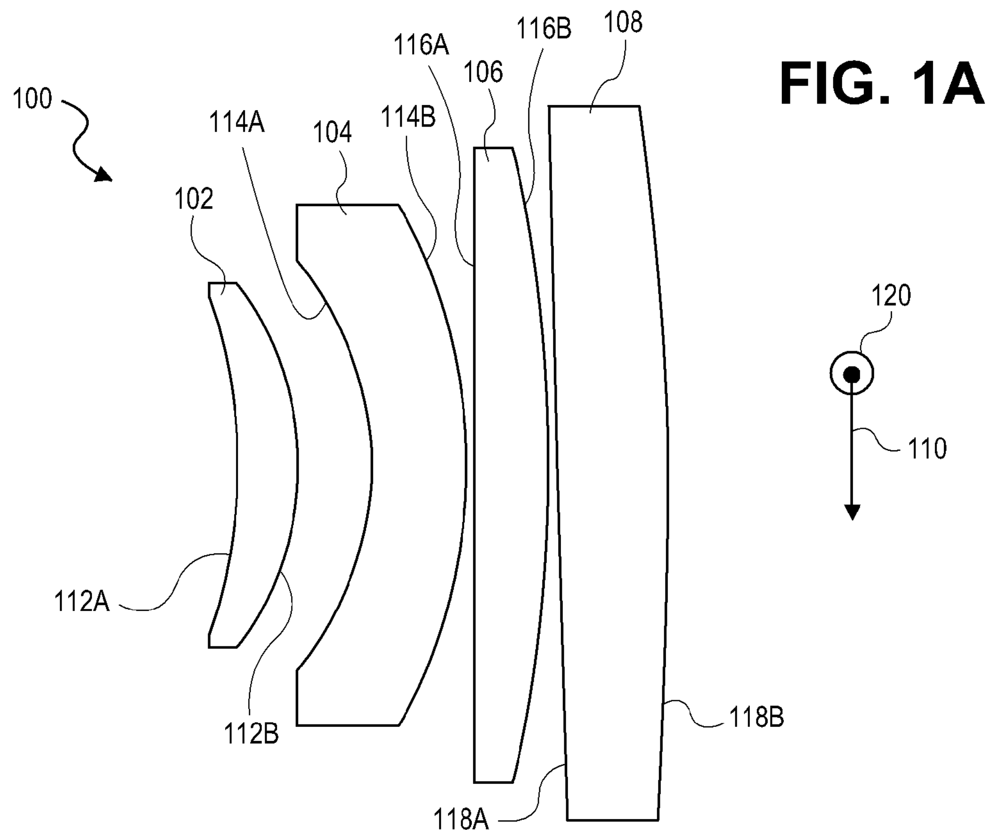
FIG. 1A is a diagram of a top view of a scan lens for an imaging device, according to an embodiment of the present disclosure.
Figure 1B:
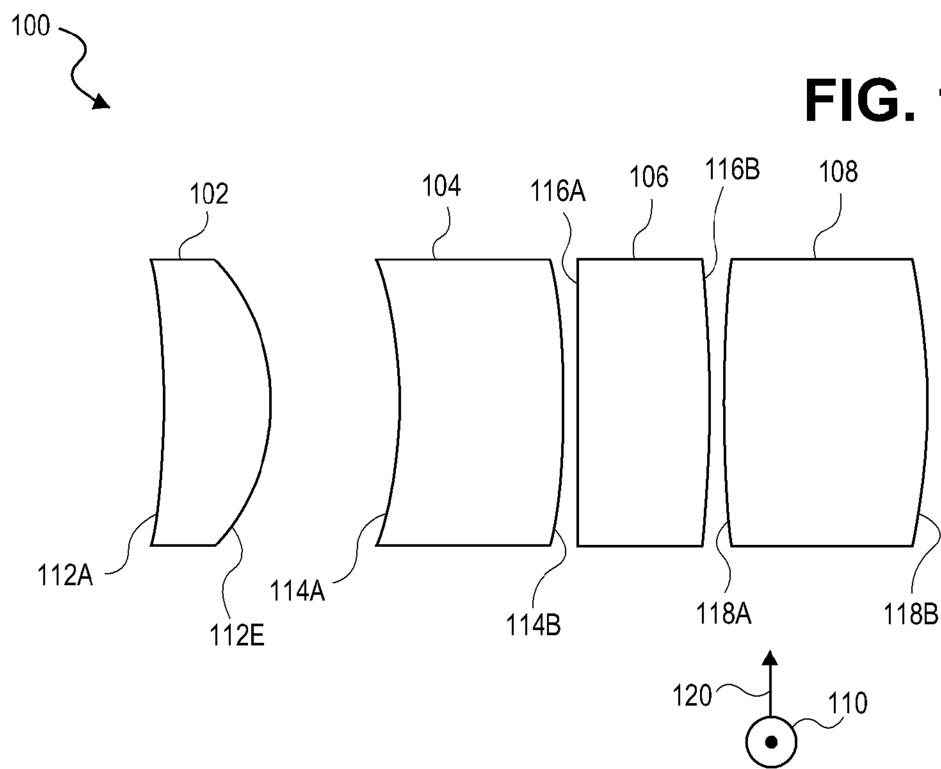
FIG. 1B is a diagram of a front view of a scan lens for an imaging device, according to an embodiment of the present disclosure.

FIGS. 1A and 1B show a top view and a front view, respectively, of a scan lens 100 for an imaging device, according to an embodiment of the present disclosure. The front view of the scan lens 100 in FIG. 1B has its various curvatures exaggerated for illustrative clarity. Furthermore, the front view of the scan lens 100 in FIG. 1B is exaggerated in scale for illustrative clarity. In the top view of FIG. 1A, an in-scan direction 110 is indicated by an arrow pointing from top to bottom, whereas a cross-scan direction 120 is indicated by an arrow tip coming out of the page. In the front view of FIG. 1B, the in-scan direction 110 is indicated by an arrow tip coming out of the plane of the page, and the cross-scan direction 120 is indicated by an arrow pointing from bottom to top.

The in-scan direction 110 is the direction in which an optical beam is scanned by a scanning component of the imaging device such as a polygonal mirror, through the scan lens 100, and onto and across a photoconductive surface of the imaging device. The in-scan direction 110 corresponds to a direction across the width of a sheet of media (for a portrait-mode printing device that moves the media sheet length-wise through the device) on which an image is to be formed. The in-scan direction may also be referred to as simply the scan direction. The cross-scan direction 120 is perpendicular to the in-scan direction 110, and corresponds to a direction across the height or length of a sheet of media (for a portrait-mode printing device) on which an image is to be formed. The cross-scan direction may also be referred to as the process direction, or the sub-scan direction.

The scan lens 100 includes four lens elements 102, 104, 106, and 108, each of which may be a single lens. The lens elements 102, 104, 106, and 108, are said to be optically positioned in ascending numerical order between a scanning component and a photoconductive surface of the imaging device, upon installation of the scan lens within the imaging device. That is, the lens element 102 is closer to the scanning component than the lens elements 104, 106, and 108; the lens element 104 is closer to the scanning component than the lens elements 106 and 108; and, the lens element 106 is closer to the scanning component than the lens element 108. Likewise, the lens element 108 is closer to the photoconductive surface than the lens elements 102, 104, and 106; the lens element 106 is closer to the photoconductive surface than the lens elements 102 and 104; and, the lens element 104 is closer to the photoconductive surface than the lens element 102.

The lens element 102 has positive, zero, or negative optical power in the in-scan direction 110 and a positive optical power in the cross-scan direction 120. The lens element 104 has a negative optical power in the in-scan direction 110 and in the cross-scan direction 120. Furthermore, the lens element 106 has a positive optical power in the in-scan direction 110 and in the cross-scan direction 120, and the lens element 108 has a positive, negative, or zero optical power in the in-scan direction 110 and positive optical power in the cross-scan direction 120.

The optical power of a lens element is defined as the inverse, or the reciprocal, of the focal length of the lens element. For example, a lens element having a focal length of +100 mm has an optical power of +0.01/mm, and a lens element having a focal length of −40 mm has an optical power of −0.025/mm. In general, converging lens elements have positive optical power and are thicker at their centers than at their edges, whereas diverging lens elements have negative optical power and are thinner at their centers than at their edges.

It is noted that an anamorphic lens element is not rotationally symmetric about an optical axis but has a different optical power in two orthogonal directions such as the in-scan direction and the cross-scan direction. An anamorphic lens element has at least one anamorphic surface. An anamorphic surface has a different radius of curvature in two orthogonal directions, such as the in-scan direction than in the cross-scan direction. A toric surface is a type of anamorphic surface and a cylindrical surface may be considered as a special type of toric surface in which one of the radii of curvature is infinite.

By comparison, a rotationally symmetric surface has the same radius of curvature in the in-scan direction and in the cross-scan direction. Rotationally symmetric surfaces include spherical surfaces, such as spherically convex and spherically concave surfaces, and planar surfaces. A planar surface may be considered a special type of spherical surface, in which the radius of curvature is infinite. The surface curvature directions “convex” and “concave” are defined with respect to an observer immediately outside of a lens element (normally in air) and looking at the nearest lens surface.

The lens element 102 has a positive optical power in the cross-scan direction and a greater optical power in the cross-scan direction 120 than in the in-scan direction 110. The lens element 102 has a first surface 112A and a second surface 112B, collectively referred to as the surfaces 112. An optical beam enters the lens element 102 at the first surface 112A and exits the lens element 102 at the second surface 112B. The first surface 112A may be rotationally symmetric or have another surface shape. While the first surface 112A is depicted in FIGS. 1A and 1B as being rotationally symmetric and concave, in another embodiment the first surface 112A may be planar or convex, and may be anamorphic. The second surface 112B is an anamorphic surface, in which the radius of curvature is shorter in the cross-scan direction 120 than in the in-scan direction 110. The surface 112B may be a toric surface. [part number 112E in FIG. 2 should be 112B.]

The lens element 104 has negative optical power in the cross-scan direction 120 and in the in-scan direction 110. The lens element 104 has a first surface 114A and a second surface 114B, collectively referred to as the surfaces 114. An optical beam enters the lens element 104 at the first surface 114A and exits the lens element 104 at the second surface 114B. The surface 114A is concave in the in-scan direction 110 and in the cross-scan direction 120. The surface 114A is depicted in FIGS. 1A and 1B as being a rotationally symmetric concave surface, but it may alternatively be an anamorphic surface in one embodiment. The surface 114B is depicted in FIGS. 1A and 1B as being a rotationally symmetric convex surface, but may in another embodiment be an anamorphic surface.

The lens element 106 has a positive optical power in the cross-scan direction 120 and in the in-scan direction 110. The lens element 106 has a first surface 116A and a second surface 116B, collectively referred to as the surfaces 116. An optical beam enters the lens element 106 at the first surface 116A and exits the lens element 106 at the second surface 116B. The surface 116A is depicted in FIGS. 1A and 1B as being a planar surface, but may alternatively be convex or concave, and may be rotationally symmetric or anamorphic in one embodiment. The surface 116B is depicted in FIGS. 1A and 1B as being a rotationally symmetric convex surface, but may alternatively be planar or concave and may be an anamorphic surface in one embodiment.

The lens element 108 has a positive optical power in the cross-scan direction and a greater positive optical power in the cross-scan direction 120 than in the in-scan direction 110. Accordingly, the lens element 108 has at least one anamorphic surface. The lens element 108 has a first surface 118A and a second surface 118B, collectively referred to as the surfaces 118. An optical beam enters the lens element 108 at the first surface 118A and exits the lens element 108 at the second surface 118B. In one embodiment, as depicted in FIGS. 1A and 1B, the surface 118A is a convex cylindrical surface having curvature just in the cross-scan direction 120, but the surface 118A may alternatively be a toric or otherwise anamorphic surface having a shorter radius of curvature in the cross-scan direction 120 than in the in-scan direction 110. As depicted in FIGS. 1A and 1B, the surface 118B may be a rotationally symmetric surface.

In another embodiment, the surface 118A may be a rotationally symmetric surface, where the surface 118B is a convex toric, convex cylindrical, or another anamorphic surface having a radius of curvature shorter in the cross-scan direction 120 than in the in-scan direction 110. In a third embodiment, the surfaces 118A and 118B are both anamorphic surfaces, which collectively give lens element 108 a greater optical power in the cross-scan direction than in the in-scan direction.

In one embodiment, the lens element 104 has a higher refractive index than the lens elements 102, 106 and 108, and the lens elements 102, 106 and 108 have the same refractive index. In another embodiment, the lens element 104 has a higher refractive index than lens elements 102, 106 and 108, and the lens elements 102, 106 and 108 do not have the same refractive index.

Representative Optical Subsystem

Figure 2:
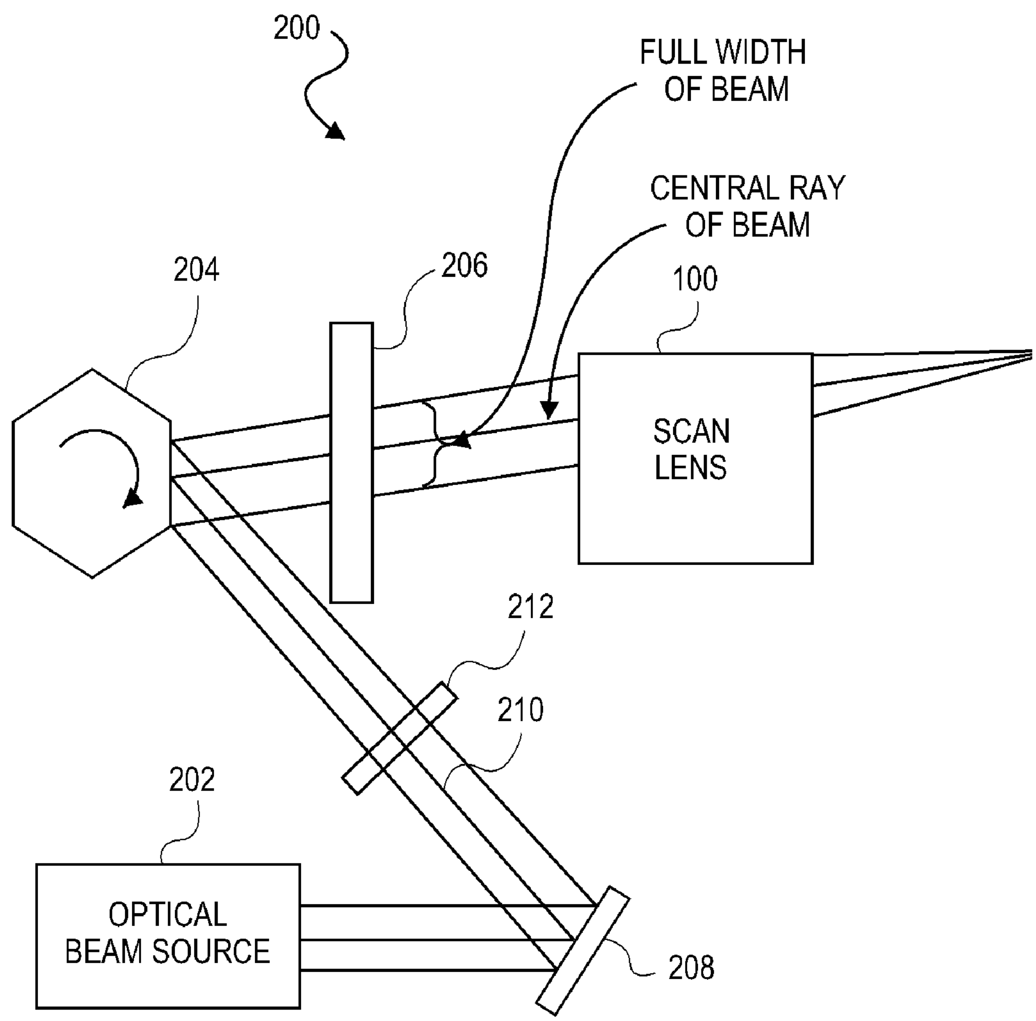
FIG. 2 is a diagram of an optical subsystem for an imaging device, including a scan lens, according to an embodiment of the present disclosure.

FIG. 2 shows an optical subsystem 200 for an imaging device, according to an embodiment of the present disclosure. The optical subsystem 200 is used within the imaging device to selectively charge or discharge a photoconductive surface of the imaging device in correspondence with an image to be formed on media. However, the photoconductive surface may not be a part of the optical subsystem 200, and therefore is not depicted in FIG. 2. The optical subsystem 200 includes an optical beam source 202, a scanning component 204, and the scan lens 100. The optical subsystem 200 may further include a pre-scan cylindrical lens 212 and/or a corrective plate 206. The optical subsystem 200 may also include other components, such as a folding mirror 208, as well as other mirrors, lenses, and/or components that are not specifically depicted in FIG. 2.

The optical beam source 202 may include one or more laser beam sources, light-emitting diodes (LED’s), or other types of optical beam sources. The optical beam source 202 outputs an optical beam 210. Whereas just one optical beam 210 is depicted in FIG. 2 for illustrative clarity and convenience, [it looks like there are 3 beams—change the lead line for part number 210 to the outside of the beam or use an arrow on the end of the lead line.] in other embodiments more than one optical beam 210, such as 22, 28, 32, or more optical beams, may be output by the optical beam source 202. In one specific embodiment, for example, there are 22 optical beams each having a wavelength of 820 nanometers (nm) and a scan-line length of 327 mm, whereas in another specific embodiment, there are 32 optical beams each having a wavelength of 650 nm and a scan-line length of 760 mm.

The optical beam source 202 outputs the optical beam 210 to ultimately expose a photoconductive surface of the imaging device, which as noted above is not shown in FIG. 2, but which is positioned optically after the scan lens 100. The folding mirror 208 permits a more compact optical system and is optically positioned after the optical beam source 202, and between the optical beam source 202 and the scanning component 204. The folding mirror 208 directs the optical beam 210 output by the optical beam source 202 towards the scanning component 204 through the pre-scan cylindrical lens 212.

The pre-scan cylindrical lens 212 is a type of optical component that causes the optical beam 210 to converge to a focus in the cross-scan direction at or near a surface of the scanning component 204. The optical beam 210 substantially focusing at the surface of the scanning component 204 in this manner ultimately desensitizes the cross-scan position of the beam 210 at the photoconductive surface to any cross-scan wobble of the scanning component 204. The scanning component 204 is optically positioned between the pre-scan cylindrical lens 212 and the corrective plate 206, and before the scan lens 100. The scanning component 204 may be a rotating polygonal mirror in one embodiment, such as a rotating hexagonal mirror as is particularly depicted in FIG. 2.

The scanning component 204 scans (i.e., directs) the optical beam 210 through the corrective plate 206 and the scan lens 100, and onto and across the photoconductive surface of the imaging device. The corrective plate 206 is optically positioned in one embodiment between the scanning component 204 and the scan lens 100, and before the scan lens 100. In another embodiment, the corrective plate 206 is optically positioned after the scan lens 100, and between the scan lens 100 and the photoconductive surface of the imaging device. The scan lens 100 is optically positioned after the optical beam source 202 and after the scanning component 204, and between the scanning component 204 and the photoconductive surface of the imaging device.

The corrective plate 206 has an aspherical surface to correct residual focal plane curvature of the optical beam 210. In one embodiment, at least one of the surfaces of the corrective plate 206 has a shape which can be described by a polynomial equation of the form $z=\Sigma A_{mn}X^mY^n$, where z is a height of the surface, the $A_{mn}$ terms are constants, x is a position in the in-scan direction, and y is a position in the cross-scan direction. More specifically, m+n can be equal to 0, 1, . . . , 10.

Representative Imaging Device

Figure 3:
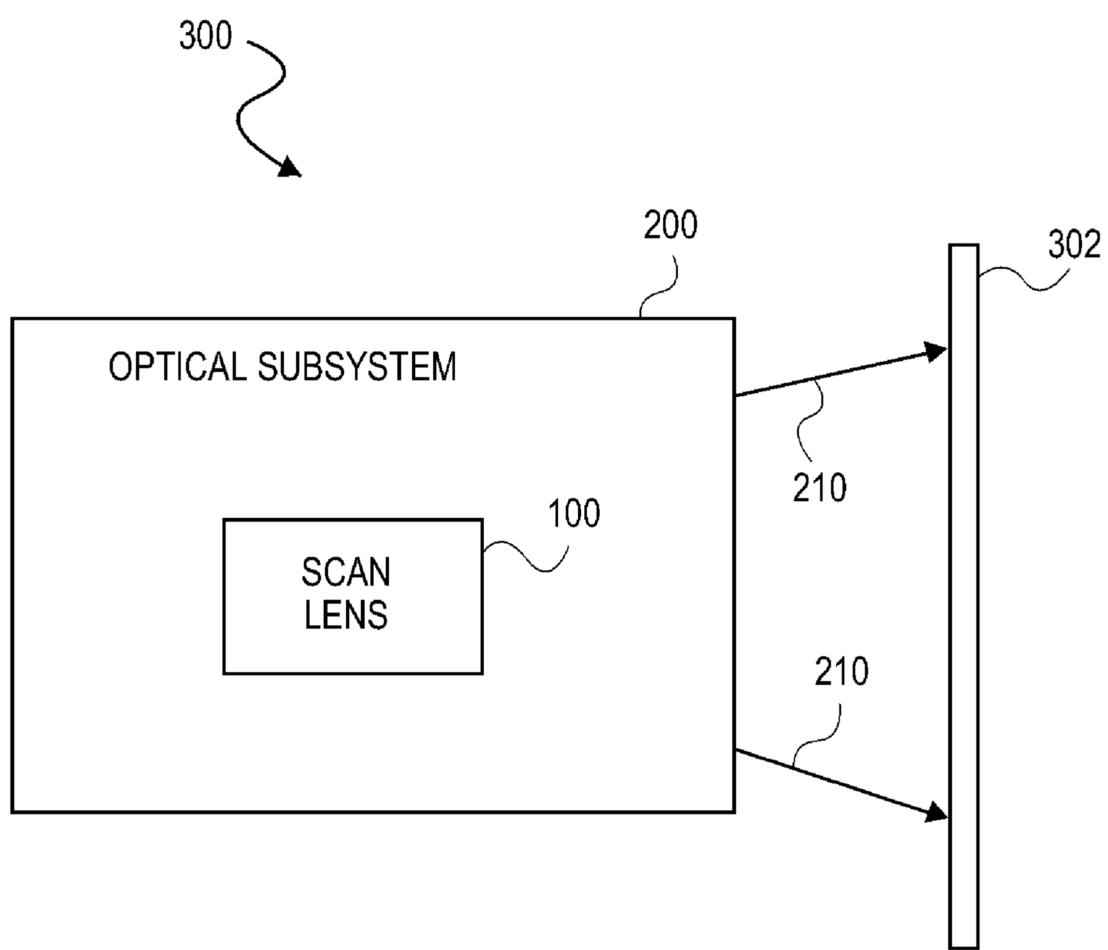
FIG. 3 is a diagram of a portion of an imaging device, including an optical subsystem, according to an embodiment of the present disclosure.

FIG. 3 shows a portion of an imaging device 300, according to an embodiment of the present disclosure. The imaging device 300 forms images on media, such as graphics and/or text on paper. The imaging device 300 may be a printing device, like a laser printing device or an LED printing device. The imaging device 300 includes the optical subsystem 200, which includes the scan lens 100 as has been described. The imaging device 300 further includes a photoconductive surface 302. The imaging device 300 typically includes other components, in addition to those depicted in FIG. 3, as is described below.

As has been described, the photoconductive surface 302 is selectively charged or discharged in correspondence with the image to be formed on media by the imaging device 300. The photoconductive surface 302 is depicted in FIG. 3 as being flat, but more typically is a rotating drum. The optical subsystem 200 selectively charges or discharges the photoconductive surface 302 in correspondence with the image to be formed on media, by modulating and scanning the optical beam 210 across the surface 302. If the photoconductive surface 302 is initially charged, then the surface 302 is selectively discharged at locations where the optical beam 210 exposes the surface 302. Likewise, if the photoconductive surface 302 is initially discharged, then the surface 302 is selectively charged at locations where the optical beam 210 exposes the surface 302.

In at least one embodiment of the present disclosure, once the photoconductive surface 302 has been selectively charged or discharged, the resulting charge pattern is developed by applying ink, toner or other colorant to the photoconductor. The developed image is then transferred to the media or to an intermediate transfer surface and then to the media, as is customary. The toner or other colorant is attracted to the photoconductor just where the photoconductor has been charged or discharged; as such, an image is formed on the photoconductor and transferred to the media in correspondence with the charge pattern. Thereafter, the toner or other colorant may be fused to the media as is customary, so that it remains permanently affixed to the media. In this way, an image is formed on media by the imaging device 300.

It is noted that some embodiments of the present disclosure have been described in relation to an electrophotographic printing process, in which toner is ultimately applied to a media sheet in accordance with a desired image by using a photoconductive surface. However, other embodiments may be implemented in relation to other types of printing processes. Such other printing processes include photographic and photothermal printing processes. As such, the description of embodiments of the disclosure herein is applicable to other types of printing processes, in which the photoconductive surface may be replaced by another type of photosensitive surface, or another type of imaging surface.

What is claimed is:

1. A scan lens for an imaging device comprising:

a first lens element having an optical power in an in-scan direction of the imaging device and an optical power in a cross-scan direction of the imaging device, the optical power in the cross-scan direction being positive and greater than the optical power in the in-scan direction;

a second lens element having a negative optical power in the in-scan direction and in the cross-scan direction;

a third lens element having a positive optical power in the in-scan direction and in the cross-scan direction; and, a fourth lens element having an optical power in the in-scan direction and a positive optical power in the cross-scan direction, the optical power in the cross-scan direction being greater than the optical power in the in-scan direction, wherein, upon installation of the scan lens within the imaging device, the first, second, third, and fourth lens elements are optically positioned in ascending numeric order between a scanning component of the imaging device and an imaging surface of the imaging device.

2. The scan lens of claim 1, wherein the first lens element has a first surface in which an optical beam is to enter the first lens element and a second surface in which the optical beam is to exit the first lens element, and wherein the second surface is an anamorphic surface such that a radius of curvature of the second surface is shorter in the cross-scan direction than a radius of curvature of the second surface in the in-scan direction.

3. The scan lens of claim 1, wherein the fourth lens element has a first surface in which an optical beam is to enter the fourth lens element and a second surface in which the optical beam is to exit the fourth lens element, and wherein the second surface is an anamorphic surface such that a radius of curvature of the second surface is shorter in the cross-scan direction than a radius of curvature of the second surface in the in-scan direction.

4. The scan lens of claim 3, wherein the second surface is a cylindrical surface.

5. The scan lens of claim 1, wherein the fourth lens element has a first surface in which an optical beam is to enter the fourth lens element and a second surface in which the optical beam is to exit the fourth lens element, and wherein the first surface is an anamorphic surface such that a radius of curvature of the first surface is shorter in the cross-scan direction than a radius of curvature of the first surface in the in-scan direction.

6. The scan lens of claim 5, wherein the first surface is a cylindrical surface.

7. An optical subsystem for an imaging device, comprising:

an optical beam source to output an optical beam to expose an imaging surface of the imaging device;

a scan lens optically positioned after the optical beam source to direct the optical beam towards the photoconductive surface; and, a scanning component optically positioned before the scan lens to scan the optical beam through the scan lens and across the photoconductive surface, wherein the scan lens comprises:

a first lens element having an optical power in an in-scan direction of the imaging device and an optical power in a cross-scan direction of the imaging device, the optical power in the cross-scan direction being positive and greater than the optical power in the in-scan direction;

a second lens element having a negative optical power in the in-scan direction and in the cross-scan direction;

a third lens element having a positive optical power in the in-scan direction and in the cross-scan direction; and, a fourth lens element having an optical power in the in-scan direction and a positive optical power in the cross-scan direction, the optical power in the cross-scan direction being greater than the optical power in the in-scan direction, and wherein, upon installation of the optical subsystem within the imaging device, the first, second, third, and fourth lens elements are optically positioned in ascending numeric order between the scanning component and the imaging surface.

8. The optical subsystem of claim 7, further comprising a corrective plate having an aspherical surface to correct focal plane curvature, wherein the corrective plate is optically positioned before or after the scan lens, or between two scan lens elements.

9. The optical subsystem of claim 7, wherein the first lens element has a first surface in which an optical beam is to enter the first lens element and a second surface in which the optical beam is to exit the first lens element, and wherein the second surface is an anamorphic surface such that a radius of curvature of the second surface is shorter in a cross-scan direction than a radius of curvature of the second surface in the in-scan direction.

10. The optical subsystem of claim 7, wherein the fourth lens element has a first surface in which an optical beam is to enter the fourth lens element and a second surface in which the optical beam is to exit the fourth lens element, and wherein the second surface is an anamorphic surface such that a radius of curvature of the second surface is shorter in the cross-scan direction than a radius of curvature of the second surface in the in-scan direction.

11. The optical subsystem of claim 7, wherein the fourth lens element has a first surface in which an optical beam is to enter the fourth lens element and a second surface in which the optical beam is to exit the fourth lens element, and wherein the first surface is an anamorphic surface such that a radius of curvature of the second surface is shorter in the cross-scan direction than a radius of curvature of the first surface in the in-scan direction.

12. An imaging device comprising:

a photoconductive surface to be selectively charged or discharged in correspondence with an image to be formed on media by the imaging device;

an optical beam source to output an optical beam to expose the photoconductive surface;

a scan lens optically positioned after the optical beam source to direct the optical beam towards the photoconductive surface; and, a scanning component optically positioned before the optical beam source to scan the optical beam through the scan lens and across the photoconductive surface, wherein the scan lens comprises:

a first lens element having an optical power in an in-scan direction of the imaging device and an optical power in a cross-scan direction of the imaging device, the optical power in the cross-scan direction being positive and greater than the optical power in the in-scan direction;

a second lens element having a negative optical power in the in-scan direction and in the cross-scan direction;

a third lens element having a positive optical power in the in-scan direction and in the cross-scan direction; and, a fourth lens element having an optical power in the in-scan direction and a positive optical power in the cross-scan direction, the optical power in the cross-scan direction being greater than the optical power in the in-scan direction, and wherein the first, second, third, and fourth lens elements are optically positioned in ascending numeric order between the scanning component and the photoconductive surface.

13. The imaging device of claim 12, wherein the first lens element has a first surface in which an optical beam is to enter the first lens element and a second surface in which the optical beam is to exit the first lens element, and wherein the second surface is an anamorphic surface such that a radius of curvature of the second surface is shorter in a cross-scan direction than a radius of curvature of the second surface in the in-scan direction.

14. The imaging device of claim 12, wherein the fourth lens element has a first surface in which an optical beam is to enter the fourth lens element and a second surface in which the optical beam is to exit the fourth lens element, and wherein the second surface is an anamorphic surface such that a radius of curvature of the second surface is shorter in the cross-scan direction than a radius of curvature of the second surface in the in-scan direction.

15. The imaging device of claim 12, wherein the fourth lens element has a first surface in which an optical beam is to enter the fourth lens element and a second surface in which the optical beam is to exit the fourth lens element, and wherein the first surface is an anamorphic surface such that a radius of curvature of the first surface is shorter in the cross-scan direction than a radius of curvature of the first surface in the in-scan direction.

* * * * *